United States Patent
Yoshii et al.

[19]

[11] Patent Number: 6,123,910
[45] Date of Patent: *Sep. 26, 2000

[54] METHOD OF PREDICTING AND CONTROLLING HARMFUL OXIDE AND APPARATUS THEREFOR

[75] Inventors: Yasuo Yoshii, Ibaraki-ken; Tomohiko Miyamoto, Takahagi; Jinichi Tomuro, Hitachinaka; Tooru Inada, Hitachi; Nobuyuki Hokari, Hitachinaka; Katsuya Oki, Hiroshima, all of Japan

[73] Assignees: Hitachi, Ltd.; Babcock-Hitachi Kabushiki Kaisha, both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/777,477

[22] Filed: Dec. 30, 1996

Related U.S. Application Data

[63] Continuation-in-part of application No. 08/490,488, Jun. 14, 1995, abandoned.

[30] Foreign Application Priority Data

Jun. 14, 1994 [JP] Japan .................................. 6-132088

[51] Int. Cl.$^7$ .................................................. C01B 21/00
[52] U.S. Cl. ................ 423/235; 423/244.01; 423/244.08
[58] Field of Search ............................. 423/235, 244.01, 423/244.08

[56] References Cited

U.S. PATENT DOCUMENTS

| | | | |
|---|---|---|---|
| 4,473,537 | 9/1984 | Ford, Jr. et al. | 423/239.1 |
| 5,047,220 | 9/1991 | Polcer | 423/239.1 |
| 5,237,939 | 8/1993 | Spokoyny et al. | 110/345 |

FOREIGN PATENT DOCUMENTS

| | | | |
|---|---|---|---|
| 0 604 236 | 6/1994 | European Pat. Off. | 423/237 |
| 53-26766 | 3/1978 | Japan | 423/235 |
| 53-132466 | 11/1978 | Japan | 423/235 |
| 62-46123 | 2/1987 | Japan | 423/244.08 |
| 63-7823 | 1/1988 | Japan | 423/235 |
| 1-242127 | 9/1989 | Japan | 423/213.5 |

*Primary Examiner*—Tom Dunn
*Attorney, Agent, or Firm*—Antonelli, Terry, Stout & Kraus, LLP

[57] ABSTRACT

The present invention provides a method and an apparatus for predicting and calculating an amount of harmful oxide such as NOx contained in an exhaust gas from a reference concentration of harmful oxide, which is previously determined by a type of fuel supplied to a fluidized bed combustor, an amount of change of an air ratio and an amount of change of a gas residence time to the conditions of a specific air ratio and gas residence time in the combustor, and injecting a treatment agent such as $NH_3$ in an amount optimum to the predicted amount into an exhaust gas. With this arrangement, an amount of harmful oxide in the exhaust gas can be securely lowered to a target value.

15 Claims, 9 Drawing Sheets

METHOD OF PREDICTING AND CONTROLLING HARMFUL OXIDE AND APPARATUS THEREFOR

CROSS-REFERENCE TO RELATED APPLICATION

This application is a continuation-in-part of application Ser. No. 08/490,488, filed on Jun. 14, 1995 now abandoned.

BACKGROUND OF THE INVENTION

1. Field of the Invention

The present invention relates to a method of decreasing an amount of harmful oxide in an exhaust gas generated from a fluidized bed combustor for combusting solid hydrocarbon fuel, and more specifically, to a method of controlling an amount of a treatment agent to be injected into an exhaust gas and an apparatus therefor.

2. Description of the Related Art

Conventionally, a method of controlling an amount of harmful oxide such as nitrogen oxide (hereinafter, referred to as NOx) in an exhaust gas generated from a combustor includes catalytic reduction which uses a reductive catalyst and ammonia $NH_3$ as a reductant and selective non-catalytic reduction which injects a reductant into a combustor without using a catalyst. The catalytic reduction measures nitrogen oxide NOx in an exhaust gas upstream of a position at which the reductant $NH_3$ is supplied by a NOx analyzer and the reductant is supplied while controlling the amount thereof according to the measured value so that a predetermined mole ratio is obtained with respect to NOx. On the other hand, the selective non-catalytic reduction also measures NOx in an exhaust gas from the combustor by the NOx analyzer and injects the reductant while controlling the amount thereof according to the measured value so that a predetermined mole ratio is obtained with respect to NOx.

However, when the selective non-catalytic reduction of the above conventional technologies is to be applied to a fluidized bed pressurized boiler, the following problems arise. That is, a residence time of a gas, which is required by a reaction time during which $NH_3$ decreases an amount of NOx by reducing it to a target value, must be secured, and for this purpose it is necessary to inject $NH_3$ upstream of a cyclone installed downstream of the fluidized bed pressurized boiler and to proceed a reducing reaction in a high temperature pipe. However, since particles are scattered in an exhaust gas in the above method, a cyclone of any form must be installed upstream of the inlet of the NOx analyzer and further maintenance and inspection of the cyclone is necessary to operate the boiler for a long time. Further, when there is provided a sampling port which branches from the high temperature pipe connecting the outlet of the furnace of the fluidized bed pressurized boiler to the cyclone, a problem arises as to the strength of the high temperature pipe having a high internal pressure. Consequently, it is desired to calculate an amount of harmful oxide in an exhaust gas from a calculation formula including parameters such as amounts of fuel and air supplied which are controllable relating to combustion, a bed height and the like and to inject a treatment agent in an amount optimum to the calculated amount of harmful oxide into the exhaust gas and decrease harmful oxide to the target amount thereof without measuring NOx in the exhaust gas by a NOx analyzer.

SUMMARY OF THE INVENTION

An object of the present invention is to predict an amount of harmful oxide such as, for example, nitrogen oxide and sulfur oxide in an exhaust gas generated from a fluidized bed combustor by calculating it from parameters relating to combustion and to control the amount of harmful oxide.

The above object is achieved by a method of controlling an amount of harmful oxide which comprises the steps of determining a reference concentration of harmful oxide from an amount of the fuel supplied, a conversion rate to harmful oxide such as nitrogen oxide, which is determined from a ratio of content of a substance as a harmful oxide generating source and a calorific value which are determined by a type of fuel under the conditions of a specific air ratio and gas residence time in the fluidized bed combustor, and an amount of an exhaust gas, and predicting an amount of the harmful oxide such as the nitrogen oxide in the exhaust gas from the reference concentration of the harmful oxide and an amount of change of an air ratio and an amount of change of a gas residence time to the specific air ratio and gas residence time, and controlling an amount of injection of the treatment agent such as, for example, ammonia based on the amount of the harmful oxide.

It is preferable to inject the treatment agent into the exhaust gas from a nozzle disposed in an exhaust gas duct connected to the fluidized bed combustor.

The reference concentration of the harmful oxide (NOx) is determined by the following formula;

Reference Concentration of NOx=E×(Amount of Fuel Supplied)×(Ratio of All Nitrogen in Fuel)×{(Ratio of Nitrogen Contained in Fuel)/(High Level Calorific Value of Fuel)}$^m$÷(Amount of Exhaust Gas)

where, E and m are constants.

A system for recovering power by driving a gas turbine by an exhaust gas which is generated by combusting coal in a fluidized bed pressurized boiler can be achieved by a method of controlling an amount of harmful oxide which comprises the steps of detecting an amount of NOx in the exhaust gas on the downstream side of the gas turbine, further injecting ammonia when the amount of the detected NOx exceeds a predetermined upper limit value, detecting a remaining amount of ammonia on the downstream side of the gas turbine, and stopping the injection of ammonia when the amount of the detected remaining ammonia exceeds a predetermined upper limit value, in addition to the above method of controlling an amount of harmful NOx by injecting ammonia into the exhaust gas.

When an amount of sulfur oxide in an exhaust gas is controlled by injecting a desulfurizing agent such as limestone into the fluidized bed of a fluidized bed combustor, the above object can be achieved by a control method comprising the steps of determining a reference concentration of the sulfur oxide from an amount of the fuel supplied, a ratio of content of sulfur determined by a type of fuel under the condition of a specific air ratio in the fluidized bed combustor and an amount of an exhaust gas, and predicting an amount of the sulfur oxide in the exhaust gas from the reference concentration of the sulfur oxide and an amount of change of an air ratio to the specific air ratio, and controlling an amount of injection of the desulfurizing agent based on the predicted amount of the sulfur oxide.

The reference concentration of the sulfur oxide (SOx) is determined by the following formula;

Reference Concentration of SOx=I×(Amount of Fuel Supplied)×(Ratio of All Sulfur in Fuel)÷(Amount of Exhaust Gas)

where, I is a constant.

Further, the above object is achieved by an apparatus for controlling an amount of harmful oxide which comprises prediction and calculation means for determining a reference concentration of the harmful oxide from an amount of solid hydrocarbon fuel supplied, a conversion ratio to the harmful oxide, which is determined from a ratio of content of a substance as a harmful oxide generating source which is determined by a type of fuel under the conditions of a specific air ratio and gas residence time in the fluidized bed combustor and a calorific value of the substance and an amount of an exhaust gas, and calculating an amount of the harmful oxide in the exhaust gas from the reference concentration of the harmful oxide and an amount of change of an air ratio and an amount of change of a gas residence time to the specific air ratio and gas residence time and means for controlling the supply of treatment agent for controlling an amount of injection of a treatment agent based on the predicted and calculated amount of said harmful oxide.

It is preferable that the means for controlling the supply of treatment agent includes a treatment agent injection nozzle disposed in an exhaust gas duct connected to said fluidized bed combustor and an air injection nozzle disposed upstream of said treatment agent injection nozzle in the duct.

Generally speaking, when harmful oxide contained in an exhaust gas from a combustor is NOx, it is contemplated that NOx is caused by such factors as thermal NOx which is affected by combusting conditions and fuel NOx which is affected by nitrogen contained in fuel. Since a fluidized bed combustor has a low combustion temperature, although the combustor fundamentally includes a small amount of thermal NOx, the inventors have found that fuel NOx is affected an air ratio and a gas residence time in the fluidized bed among the combusting conditions.

A reason why an amount of NOx generated in the fluidized bed combustor is changed depending upon the air ratio and the gas residence time in the fluidized bed can be supposed as follows. When the air ratio is increased, an amount of oxygen in the fluidized bed is naturally increased, whereby the oxidation reaction of nitrogen in fuel is accelerated and an amount of NOx generated is increased. Further, when the air ratio is increased, a ratio of carbon in the fuel which is uncombusted is decreased, whereby a concentration of char in the fluidized bed is decreased and an amount of reducing reaction of NOx caused by char is decreased and thus an amount of NOx exhausted is increased.

A reason why an amount of NOx is increased when the gas residence time in the fluidized bed is shortened is that an amount of reducing reaction of NOx caused by char is decreased because a period of time during which NOx generated in the fluidized bed is in contact with char in the fluidized bed is shortened.

From the above mentioned, it is possible to determine a reference concentration of NOx from a conversion rate to NOx, which is obtained from a ratio of content of nitrogen in fuel and a calorific value determined by a type of the fuel under the conditions of a specific air ratio and gas residence time in the fluidized bed combustor, and an amount of an exhaust gas, and to predict an amount of NOx contained in the exhaust gas from the reference concentration of NOx and an amount of change of an air ratio and an amount of change of a gas residence time to the specific air ratio and gas residence time. Consequently, the amount of NOx can be decreased to a target value by predicting the amount of NOx by the aforesaid calculation and injecting the treatment agent in an amount optimum to the amount of NOx into an exhaust gas without measuring NOx in the exhaust gas by a NOx analyzer.

Further, NOx can be reduced by generating CO by insufficiently combusting uncombusted carbon contained in the exhaust gas by injecting air into an exhaust gas duct which introduces the exhaust gas from the fluidized bed combustor to the outside.

A reason why a concentration of sulfur oxide (hereinafter, referred to as SOx) is changed by the air ratio when a harmful component contained in the exhaust gas from the fluidized bed combustor is SOx is that when the air ratio increases, an amount of the total exhaust gas increased and a ratio of SOx occupied in the exhaust gas is lowered and the concentration of SOx is decreased. Thus, when the air ratio decreases, a desulfurizing reaction is made inactive and the concentration of SOx increases.

According to the method and apparatus of the present invention, since an amount of harmful oxide in an exhaust gas is predicted from a calculation formula including parameters such as an amount of fuel supplied, a ratio of a substance as a harmful oxide generating source in fuel, an amount of air supplied, a bed height and the like without measuring an amount of harmful oxide contained in the exhaust gas from the fluidized bed combustor and a reductant or a desulfurizing agent as a treatment agent is injected in an amount optimum to the predicted amount, the amount of harmful oxide in the exhaust gas can be securely reduced to a target value.

DESCRIPTION OF PREFERRED EMBODIMENTS

Embodiments of the present invention will be described below with reference to the drawings.

Figure 1:
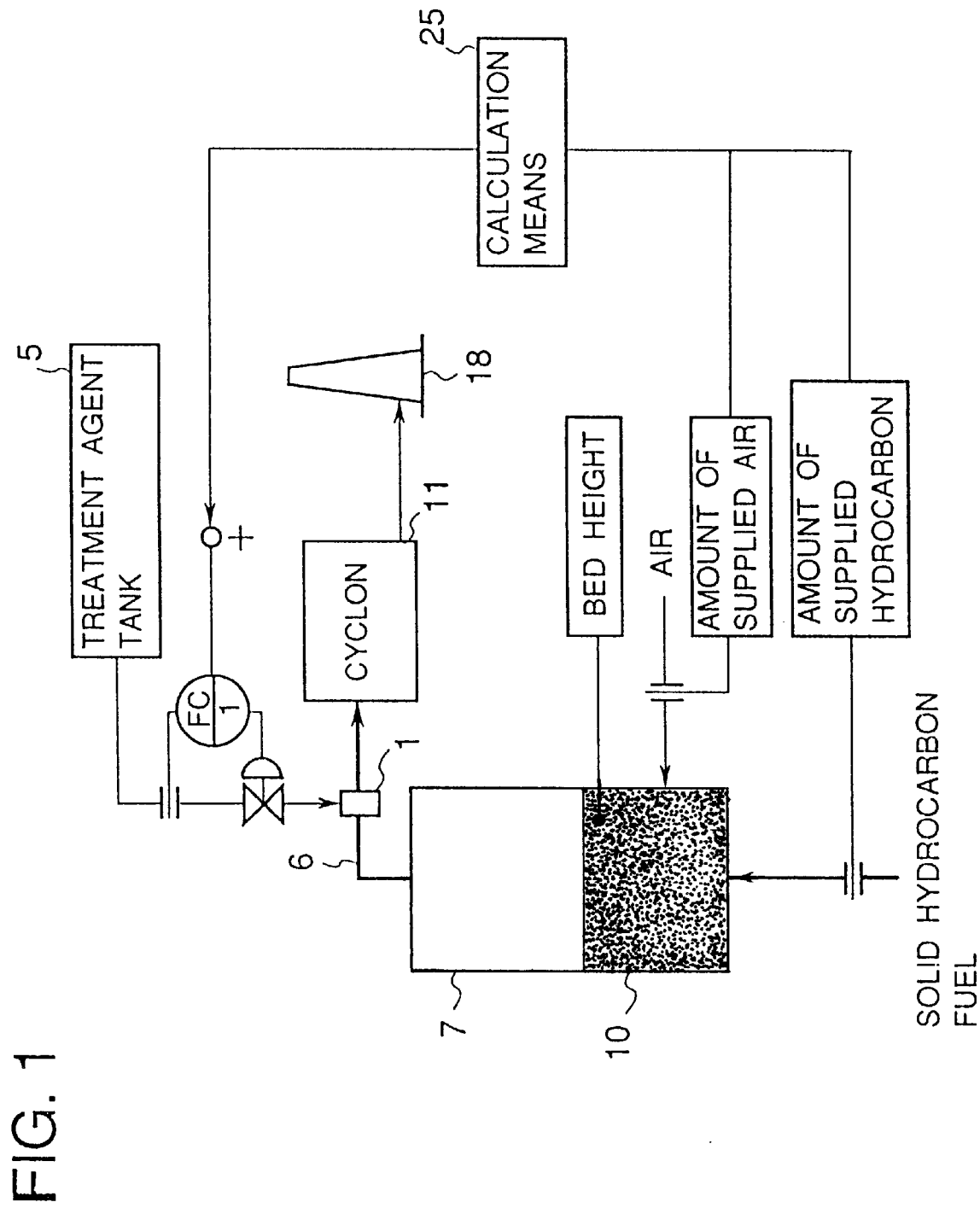
FIG. 1 is a schematic diagram showing a basic arrangement of an embodiment according to the present invention.

FIG. 1 is a schematic diagram showing a basic arrangement explaining a basic arrangement of an embodiment for treating an exhaust gas when solid hydrocarbon fuel is combusted by a fluidized bed combustor according to the present invention.

As shown in FIG. 1, an amount of harmful oxide in an exhaust gas discharged from a fluidized bed combustor 7 to a high temperature pipe 6 for exhaust gas is calculated by calculation means 25 from an air ratio in the fluidized bed combustor 7, a gas residence time in a fluidized bed 10 and a reference concentration of harmful oxide. The air ratio is a ratio obtained by dividing an amount of air actually supplied for combustion by an amount of air needed to completely combust fuel. The air ratio is calculated from an amount of solid hydrocarbon fuel supplied and an amount of air supplied, the gas residence time in the fluidized bed is calculated from a bed height, and the reference concentration of harmful oxide is calculated from the amount of solid hydrocarbon fuel supplied, a conversion ratio to harmful oxide, which is obtained from a ratio of content of a substance as a harmful oxide generating source (e.g. nitrogen) and a calorific value which are determined by a type of fuel under the conditions of a specific air ratio and gas residence time in the fluidized bed combustor, and an amount of a combusted exhaust gas. An amount of harmful oxide in the exhaust gas is determined from the reference concentration of harmful oxide and an amount of change of the air ratio and an amount of change of the gas residence time to the specific air ratio and gas residence time. An amount of a treatment agent which is suitable to the amount of harmful oxide is injected from a treatment agent tank 5 into the high temperature pipe 6 for exhaust gas or into the fluidized bed combustor 7 through a treatment agent injection nozzle 1, and an amount of harmful oxide discharged from a smoke stack 18 is decreased to a target value as a result of the reaction of the exhaust gas with the treatment agent.

Figure 2:
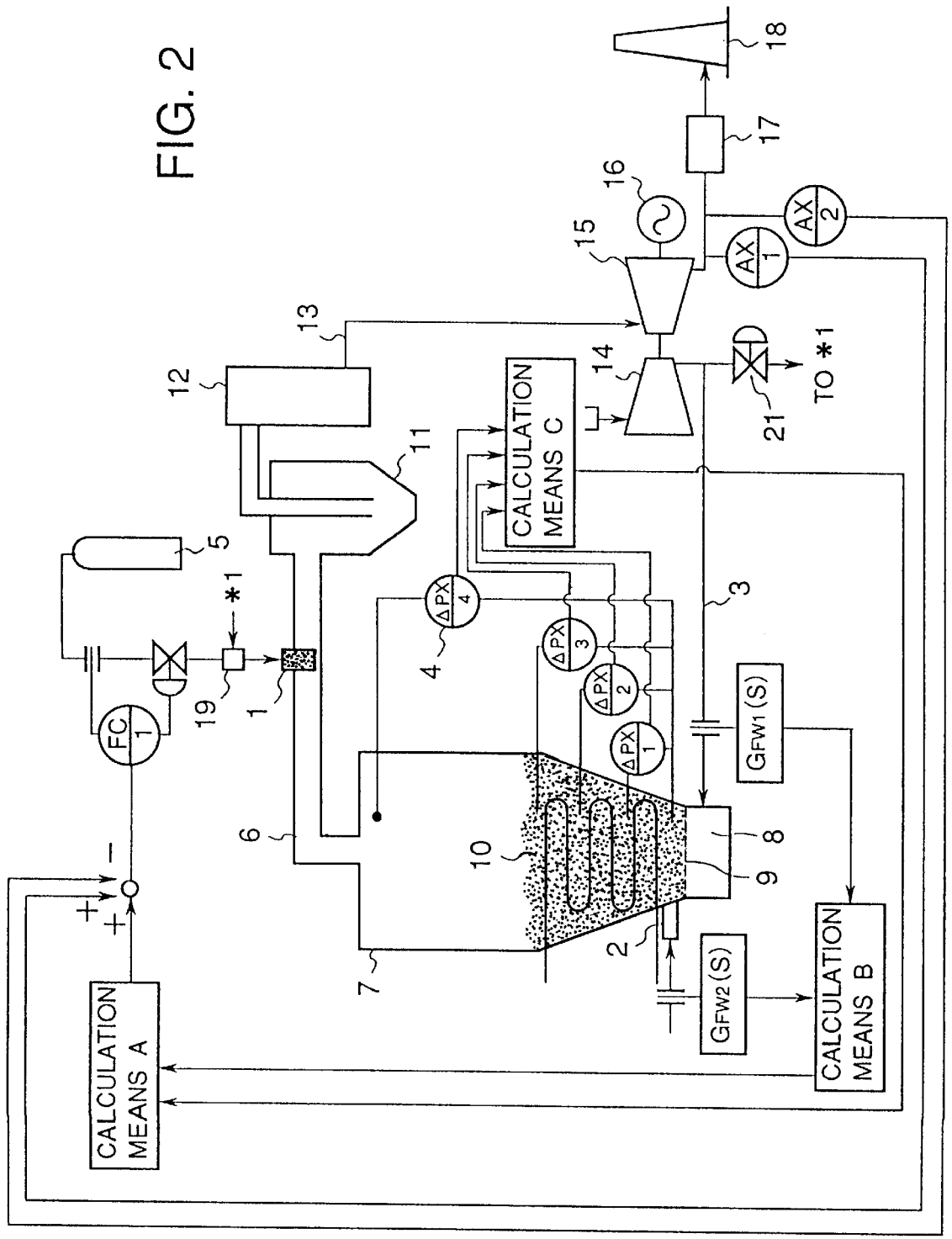
FIG. 2 is a schematic diagram showing a first embodiment according to the present invention.

FIG. 2 is a schematic diagram showing an arrangement of a first embodiment according to the present invention.

The first embodiment is an example of selective non-catalytic reduction which is effected by injecting $NH_3$ in a single column type fluidized bed plant.

At least one $NH_3$ injection nozzle 1 is installed to a high temperature pipe 6 for exhaust gas connected to the outlet of the furnace of a fluidized bed boiler. Here, a harmful component is nitrogen oxide NOx and a treatment agent is $NH_3$. This embodiment is a denitration control method composed of a combination of a feed-forward control using a formula for predicting NOx exhausted from a fluidized bed and a feedback control based on the concentrations of NOx and $NH_3$ measured by analyzers at the outlet of a gas turbine.

First, the denitration control method (feed-forward control) using the NOx prediction formula for predicting NOx from the fluidized bed will be described.

Calculation means A determines an amount of NOx from the NOx prediction formula and then determines an amount of a reductant $NH_3$ having a certain ratio to the amount of NOx and injects the reductant. The concentration of NOx is predicted from a formula (1);

$$\text{Predicted Concentration of NOx (ppm)} = \text{Reference Concentration of NOx (ppm)} + Ar(r-rs) + B(\theta s - \theta)^n \quad (1)$$

where, r: air ratio, rs: reference air ratio, θs: reference gas residence time (sec), θ: gas residence time (sec), and A, B, n: constants.

As specific conditions, the reference air ratio has a value of 1.2 and the reference gas residence time has a value of 4 seconds.

Note, the range from 1.0 to 1.4 is applicable by linear approximation with respect to the air ratio in the formula (1). Since the air ratio may exhibit a high value near to 2.0 when the plant starts, the concentration of NOx is predicted by a formula (1a);

$$\text{Predicted Concentration of NOx (ppm)} = \text{Reference Concentration}$$

$$\text{of NOx (ppm)} + A_1[A_2 - \exp\{A_3(rs-r)\}] + B(\theta s - \theta)^n \quad (1a)$$

where, $A_1, A_2, A_3$ are constants.

Calculation means B calculates the air ratio: r from an amount of fuel supplied (kg/h) and an amount of combustion air (kg/h) by using a formula (2);

$$\text{Air Ratio: } r(-) = [\text{Amount of Combustion Air (kg/h)}/\{\text{Amount of Fuel Supplied (kg/h)} \times \text{Theoretical Amount of Air (Nm}^3/\text{kg.cwp)} \times 1.293 \text{ (kg/Nm}^3)\}] \times \text{Combustion Efficiency (\%)}/100 \quad (2)$$

where, the theoretical amount of air is used when fuel is coal water paste.

Gfw1(s) and Gfw2(s) in FIG. 2 are transfer functions for compensating the dynamic characteristics of an amount of combustion air and an amount of fuel supplied, respectively.

Calculation means C calculates the gas residence time:θ (sec) in the fluidized bed from a bed height (m) which is determined from the values indicated by differential pressure gauges ΔPX-1, ΔPX-2, ΔPX-3 and ΔPX-4 and a gas velocity (m/sec) in the fluidized bed by using a formula (3);

$$\text{Gas Residence Time: } \theta \text{ (sec) in Fluidized Bed} = \{\text{Bed Height (m)}\}/\text{Gas Velocity in Fluidized Bed (m/sec)} \quad (3)$$

Here, the gas velocity (m/sec) in the fluidized bed is calculated from the amount of combustion air (kg/h), a cross sectional area in the fluidized bed combustor (m²) and a temperature in the fluidized bed (° C.) in the fluidized bed by using a formula (4);

$$\text{Gas Velocity in Fluidized Bed (m/sec)} = C\{\text{amount of combustion air (kg/h)}\} \times 1.293 \text{ (kg/Nm}^3)/3600 \times \{\text{Temperature in Fluidized Bed (° C.)} + 273\}/\{\text{Reference Temperature 0 (° C.)} + 273/\text{Pressure in Furnace (atm)}/\{\text{Cross Sectional Area in Fluidized Bed Combustor (m}^2)\}$$

where C is a constant with a value of 1.

The reference concentration of NOx is calculated from a previously analyzed and determined content of nitrogen in coal (mg/kg), a high level calorific value of coal (kcal/kg), a ratio of all the nitrogen in coal (wt %), an amount of fuel supplied and an amount of exhaust gas (kg/h) by using a formula (5);

$$\text{Reference Concentration of NOx (ppm)} = E\{\text{Amount of Fuel Supplied (kg/h)} \times \{\text{Ratio of All Nitrogen in Coal (wt \%)}\} \times [\{\text{Nitrogen Contained in Coal (mg/kg)}\}/\{\text{High Level Calorific Value of Coal (kcal/kg)}\}]^m/\{\text{Amount of Exhaust Gas (kg/h)}\} \quad (5)$$

where, E, m are constants and a ratio of nitrogen contained in coal which is converted into NOx is determined by m. Control is carried out so that an amount of $NH_3$ calculated by a formula (6) can be supplied from a $NH_3$ injection nozzle 1 disposed in the high temperature pipe 6 for exhaust gas;

$$\text{Amount of NH}_3 \text{ to be Injected (kg/h)} = F(\text{Set NH}_3/\text{Mole Ratio of NO}) \times \{\text{Predicted Concentration of NOx (ppm)}\} \quad (6)$$

where, F is a constant.

Dusts contained in an exhaust gas discharged through the exhaust gas pipe 6 are removed by a cyclone 11 and a ceramics filter 12 and supplied to a gas turbine 15 for a generator 16 through a duct 13 so that power is recovered from the exhaust gas. High pressure air generated by an air compressor 14 driven by the gas turbine 15 enters a wind box 8 through a combustion air pipe 3, is supplied to a fluidized bed 10 through a distributor 9, also supplied to a mixer 19 through a $NH_3$ diluted air adjusting valve 21, mixed with $NH_3$ supplied from a $NH_3$ tank 5 and then reaches the injection nozzle 1.

In the feedback control, the outputs from a NOx analyzer AX-1 and a $NH_3$ analyzer AX-2 act to cancel the deviation of the feed-forward control. More specifically, when the value of an amount of NOx measured by the NOx analyzer AX-1 exceeds a predetermined upper limit value, a reductant $NH_3$ is further injected, and when the value of a concentration of remaining $NH_3$ measured by the $NH_3$ analyzer AX-2 exceeds a predetermined upper limit value, the injection of the $NH_3$ is stopped. A catalytic denitration unit 17 is disposed downstream of the gas turbine 15 to further decrease NOx in the path up to the inlet of a smoke stack 18. Note, since no combustor is provided with the gas turbine 15, no NOx is generated therefrom.

When a plurality of fluidized bed boilers 7 are installed, at least one $NH_3$ injection nozzle 1 is installed to the high temperature pipe 6 for exhaust gas disposed to the outlet of the furnace of each fluidized bed boiler.

Figure 3:
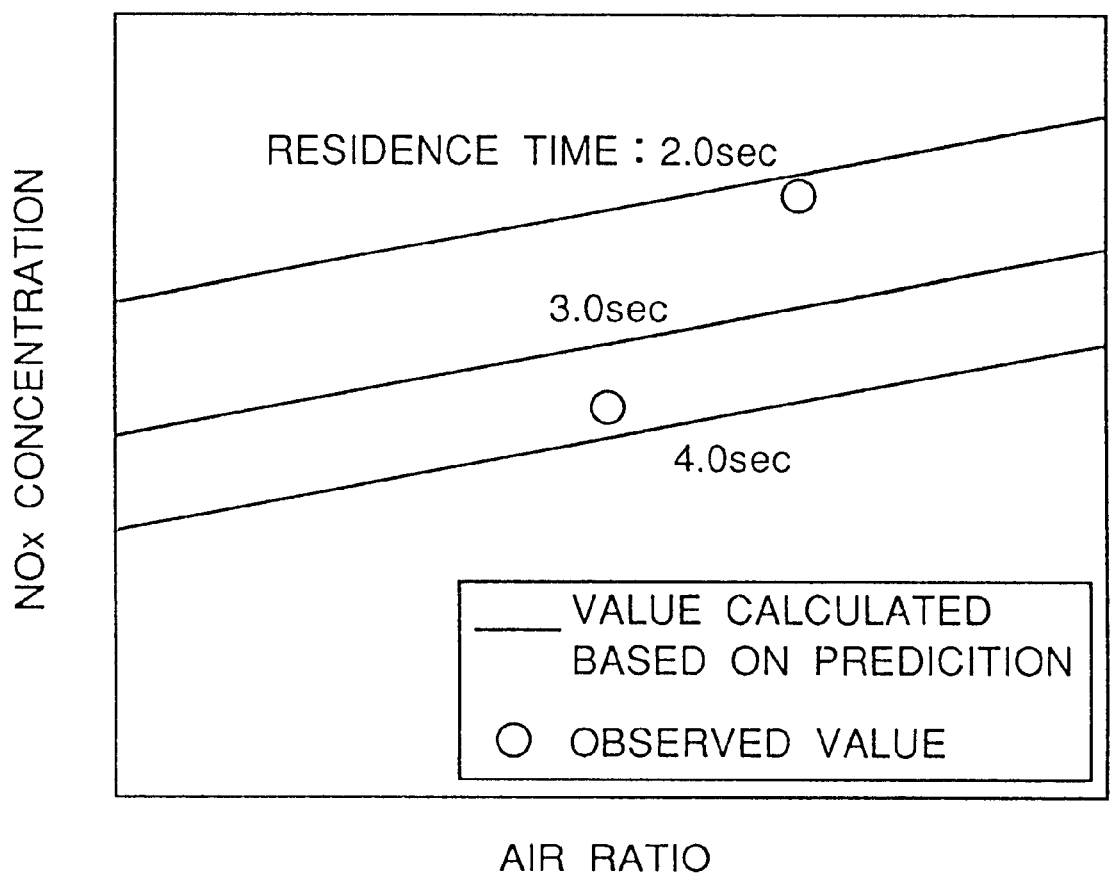
FIG. 3 is a graph showing a relationship between an air ratio, a gas residence time in a fluidized bed and a concentration of NOx of the first embodiment.

FIG. 3 is a graph explaining a relationship between an air ratio, a gas residence time in the fluidized bed and a concentration of NOx of the first embodiment.

In FIG. 3, the abscissa represents an air ratio, the ordinate represents a concentration of NOx, and a gas residence time is shown as a parameter by lines. Each line shows the calculated value of the gas residence time determined from the prediction formula (1) and the values indicated by circles are observed when the residence times are 2 seconds and 4 seconds. An increase in the air ratio or a decrease in the residence time increases a concentration of NOx. When the observed values are compared with the calculated values, since they coincide with each other within 10%, it is apparent that the concentration of NOx can be predicted from the formula (1).

Figure 4:
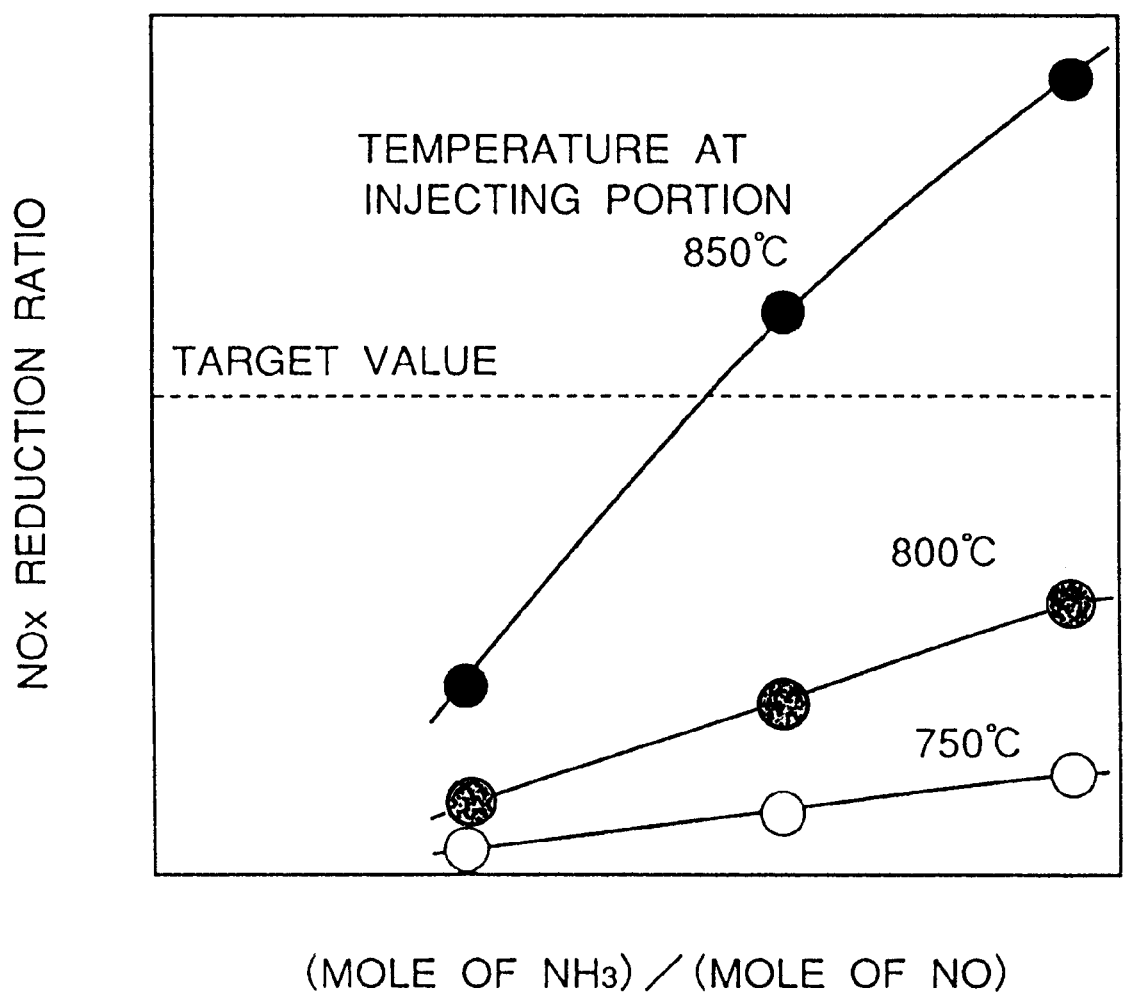
FIG. 4 is a graph showing a relationship between a mole ratio and a NOx reduction ratio of the first embodiment.

FIG. 4 is a graph explaining a relationship between a mole ratio and a NOx reduction ratio of the first embodiment of the selective non-catalytic reduction carried out by injecting $NH_3$ in the fluidized bed plant shown in FIG. 2. The abscissa represents (mole of $NH_3$/mole of NO) and the ordinate represents the NOx reduction ratio, and an increase in the NOx reduction ratio decreases an amount of NOx in the exhaust gas. Further, an amount of $NH_3$ to be supplied is increased to increase the value. An increase in the temperature in the furnace increases, i.e., an increase in a reaction temperature increases the NOx reduction ratio. The value shown by a broken line is a target value and an amount of $NH_3$ to be injected must be controlled to achieve the target value.

Figure 5:
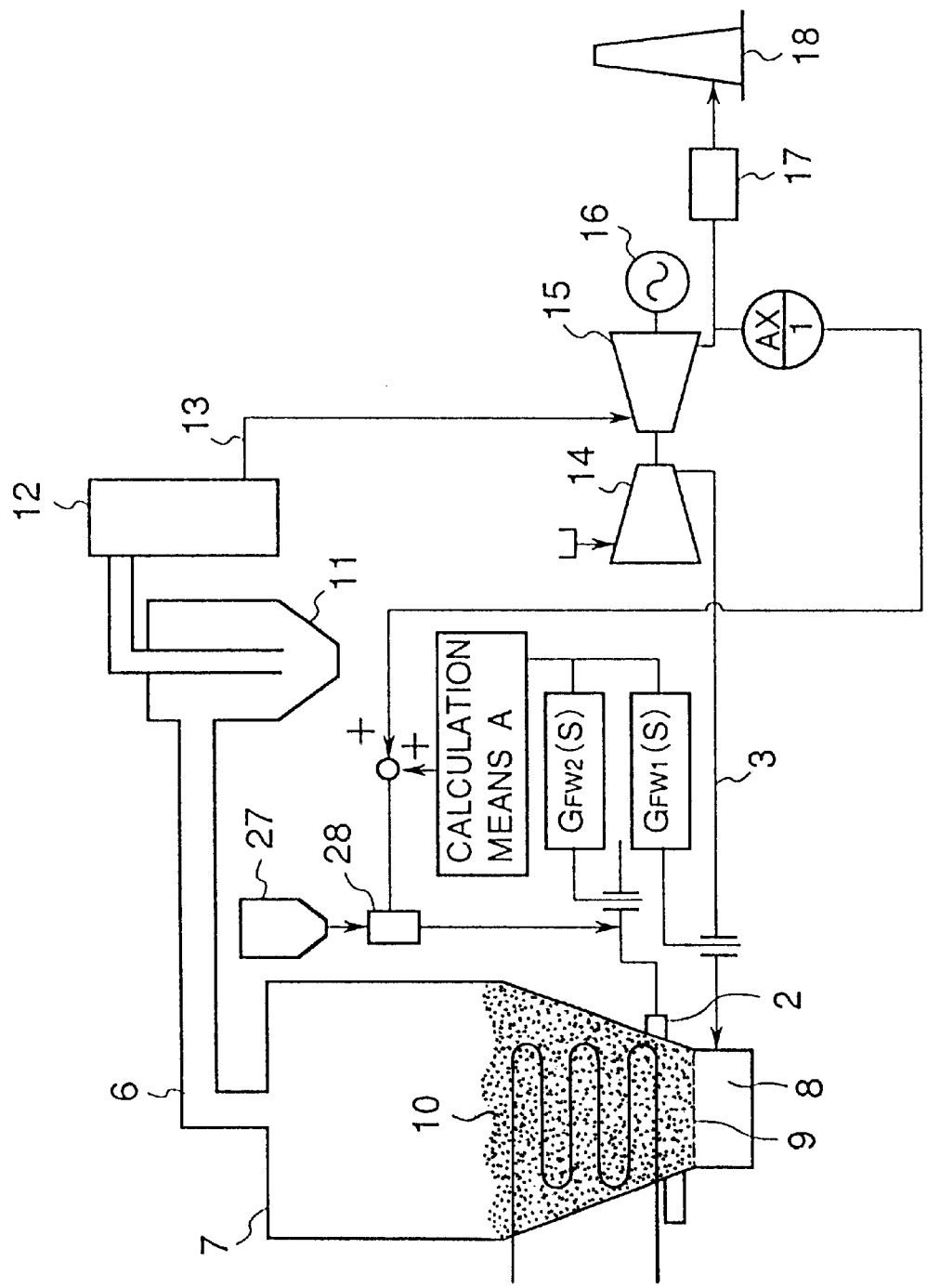
FIG. 5 is a schematic diagram showing a second embodiment according to the present invention.

FIG. 5 is a schematic diagram explaining an arrangement of a second embodiment according to the present invention.

The second embodiment is an example of desulfurization effected by injecting $CaCO_3$ in a single column type fluidized bed plant.

Here, a harmful component is sulfur oxide SOx and a treatment agent is $CaCO_3$. This embodiment is a desulfurization control method composed of a combination of a feed-forward control using a formula for predicting $SO_2$ from a fluidized bed and a feedback control based on the concentration of $SO_2$ measured by an analyzer AX-1 at the outlet of a gas turbine 15. First, the desulfurization control method (feed-forward control) using a formula for predicting SOx from the fluidized bed will be described. Calculation means A determines an amount of $SO_2$ from the $SO_2$ prediction formula and $CaCO_3$ is supplied from a desulfurizing agent banker 27 into the fluidized bed while controlling the amount thereof by a feeder 28 so that (mole of Ca)/(mole of S) has an optimum value to the above amount.

The concentration of $SO_2$ is predicted from a formula (7);

$$\text{Predicted Concentration of } SO_2 \text{ (ppm)} = \text{Reference Concentration of } SO_2 \text{ (ppm)} - G \cdot \exp(H \cdot r) \quad (7)$$

where, r: air ratio and G, H: constant.

The air ratio is calculated from an amount of fuel supplied and an amount of combustion air (kg/h) by the use of a formula (8);

$$\text{Air Ratio: } r(-) = [\text{Amount of Combustion Air (kg/h)}/\{\text{Amount of Fuel Supplied (kg/h)} \times \text{Theoretical Amount of Air } (Nm^3/kg.cwp) \times 1.293 \ (kg/Nm^3)\}] \times \text{Combustion Efficiency (\%)}/100 \quad (8)$$

The reference concentration of $SO_2$ is calculated from the amount of fuel supplied (kg/h), the ratio of all the sulfur in coal (wt %) and the amount of an exhaust gas by the use of a formula (9);

$$\text{Reference Concentration of } SO_2 \text{ (ppm)} = I\{\text{Amount of Fuel Supplied (kg/h)} \times \text{Ratio of All Sulfur in Coal (wt \%)}/100\}/\text{Amount of Exhaust Gas (kg/h)} \quad (9)$$

where, I is a constant.

In the feedback control, the output from the $SO_2$ analyzer AX-1 acts to cancel the deviation of the feed-forward control. More specifically, when the amount of $SO_2$ determined by measuring the concentration of $SO_2$ by the $SO_2$ analyzer AX-1 exceeds a predetermined upper limit value, the desulfurizing agent $CaCO_3$ is further supplied.

Figure 6:
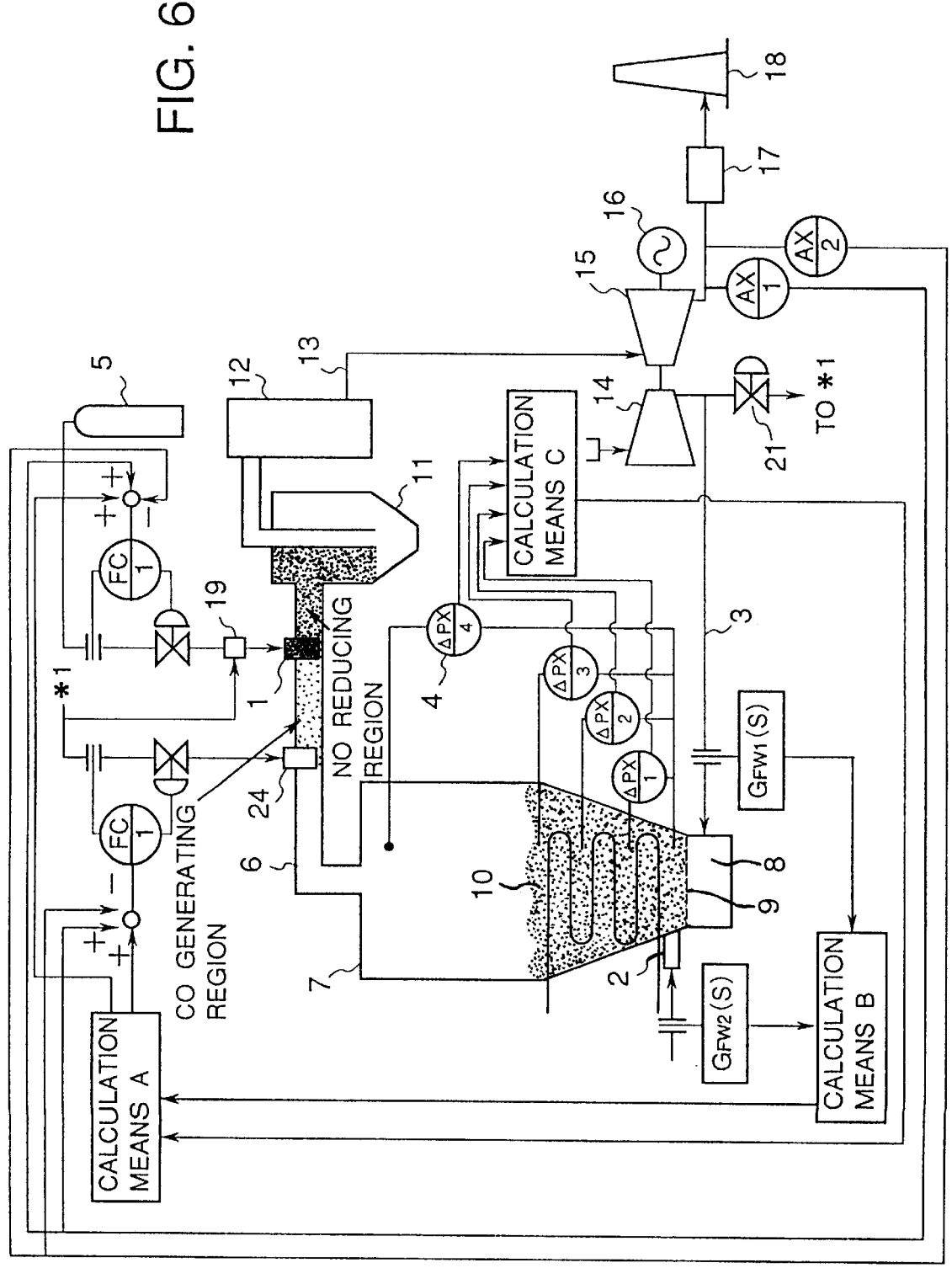
FIG. 6 is a schematic diagram showing a third embodiment according to the present invention.

FIG. 6 is a schematic diagram of a third embodiment according to the present invention.

The third embodiment is an example having an air nozzle 24 disposed upstream of the exhaust duct of a $NH_3$ injection nozzle 1 in the embodiment of the selective non-catalytic reduction effected by injecting $NH_3$ in the single column type fluidized bed plant. It is confirmed in a basic test that when CO (carbon monoxide) coexists in a NO—$NH_3$—$O_2$ denitrating reaction, a denitrating performance is increased even in a low temperature region near to 750° C. This embodiment makes use of the CO coexisting effect. That is, when a bed height is particularly low and a low load is imposed, an amount of char which is not combusted in a fluidized bed and scattered is increased. However, a denitrating reaction can be effectively proceeded in a NO reducing region after $NH_3$ has been injected even if an exhaust gas has a temperature near to 750° and the low load is imposed in such a manner that air is supplied from the air nozzle 24 disposed to the outlet of a furnace to insufficiently combust char and generate CO. It is preferable to execute the operation for generating CO by supplying air from the air nozzle 24 when the temperature of an exhaust gas is particularly lowered with a low load of about 50% imposed on a boiler. The other control of the selective non-catalytic reduction process is effected by the same method as that of the first embodiment.

Figure 7:
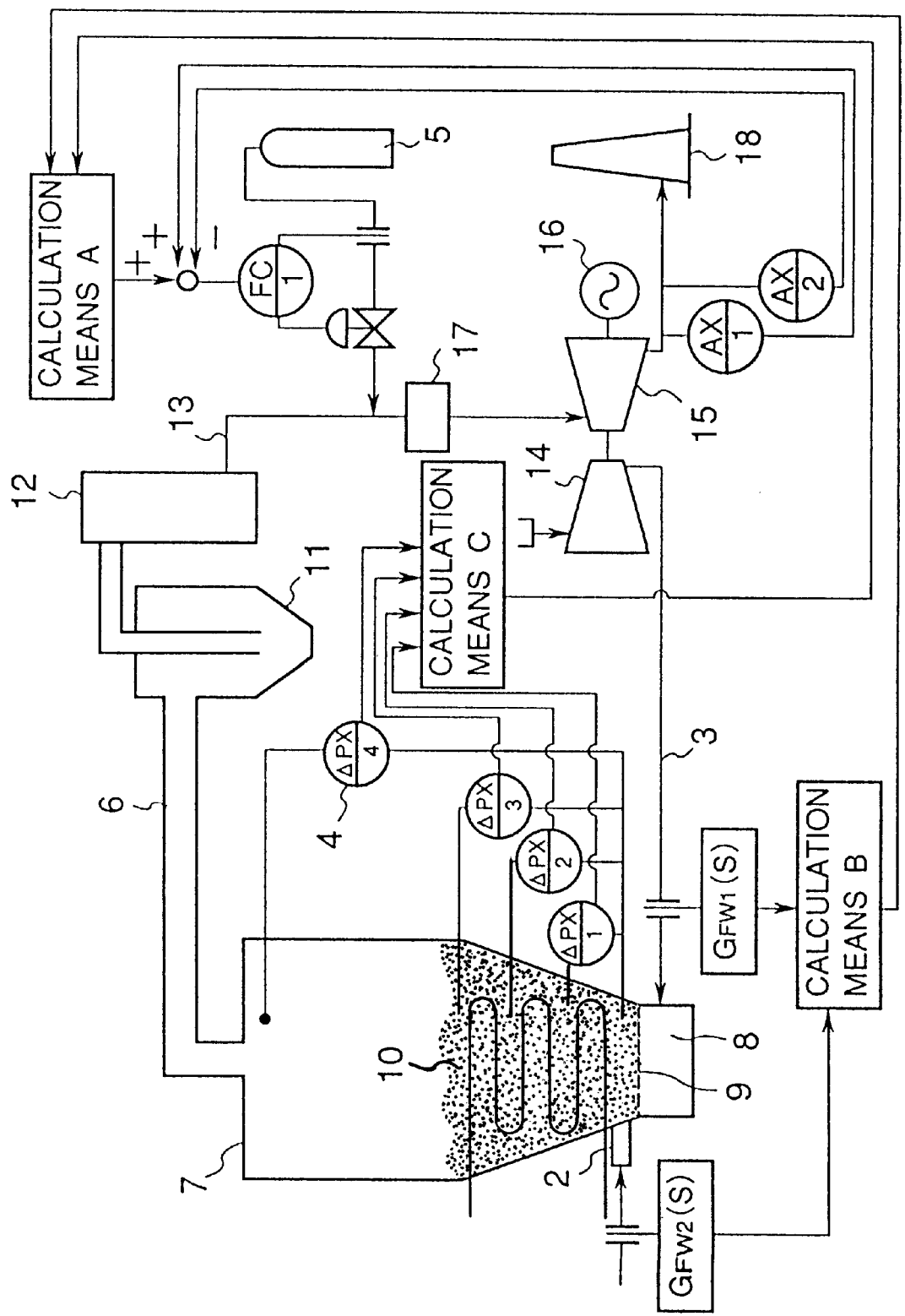
FIG. 7 is a schematic diagram showing a fourth embodiment according to the present invention.

FIG. 7 is a schematic diagram of a fourth embodiment according to the present invention.

The fourth embodiment is an embodiment which does not use the selective non-catalytic reduction but uses a high temperature resistant denitrating catalyst in a single column type fluidized bed plant. Since a gas turbine 15 has a temperature of about 850° C. at the inlet thereof when a rated load is imposed, the catalyst must endure this temperature. This embodiment is composed of a combination of a feed-forward control using a formula for predicting NOx exhausted from a fluidized bed and a feedback control based on the concentrations of NOx and $NH_3$ measured by analyzers disposed at the inlet of a smoke stack.

In the feed-forward control, calculation formulas in calculation means A, B and C are the same as those explained in the first embodiment. In the embodiment, a reductant such as $NH_3$ or the like is supplied to a high temperature catalyst 17 in an amount having a certain ratio with respect to the amount of NOx calculated by the calculation means A. In the feedback control, the outputs from a NOx analyzer AX-1 and a $NH_3$ analyzer AX-2 disposed to the output of the high temperature denitrating catalyst act to cancel the deviation of the feed-forward control. More specifically, when the amount of NOx measured by the NOx analyzer AX-1 exceeds a predetermined upper limit value, the reductant is further injected, and when the concentration of $NH_3$ measured by the $NH_3$ analyzer AX-2 exceeds a predetermined upper limit value, the injection of $NH_3$ is stopped.

According to the present invention, since the amount of harmful oxide contained in an exhaust gas can be predicted from the previously determined reference concentration of harmful oxide and the amount of change of an air ratio and the amount of change of a gas residence time with respect to a specific air ratio and gas residence time without measuring the amount of harmful oxide in an exhaust gas from the fluidized bed combustor, there can be obtained an advantage that the amount of the harmful oxide in the exhaust gas can be securely decreased to a target value by injecting a reductant or a denitrating agent as a treatment agent in an optimum amount.

Moreover, the amount of $NH_3$ injection is controlled so that $NH_3$ mole/NO mole ratio is more than 1. Desirably, $NH_3$ mole/NO mole ratio is equal to 2.

It will be appreciated from the foregoing description that when combusting solid hydrocarbon fuel, i.e. coal and such, NOx is produced. The inventors decided to find out how much NOx is produced when coal is combusted using a fluidized bed combustor by changing the types of coal used and also the air ratio and the gas residence time. The result of this study showed the following three points:

(1) As the air ratio rises, the concentration of NOx increases. The NOx conversion rate, a rate the N component in coal converts to NOx, also rises.

(2) As the gas residence time shortens, the concentration of NOx increases and the NOx conversion rate rises as well.

(3) If the gas residence time and the air ratio are held at fixed values, a fixed relationship is maintained between the NOx conversion rate and the N-component-of-coal/high-level-calorific-value. The N component of coal and the high level calorific value are determined by analyzing the coal used.

Figure 8:
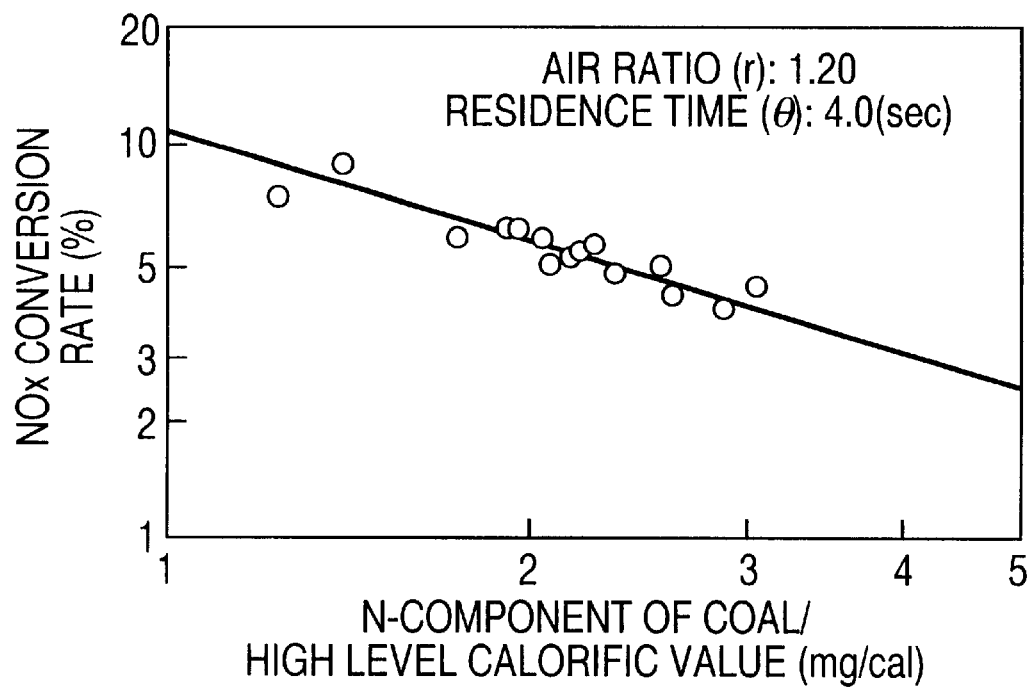
FIG. 8 is a graph showing relationship between NOx conversion rate and N-component of coal/gas-calorific value.

FIG. 8 shows a relationship between NOx conversion rate and N-component-of-coal/gas-level-calorific-value when the air ratio (r) is 1.2 and the gas residence time (θ) is 4.0. From this relationship, it was made clear that the NOx conversion rate linearly decreases as the N-component-of-coal/high-level-calorific-value increases. Formula (1) in the specification for predicting NOx concentration describes this relationship. This formula or equation is valid when solid hydrocarbon fuel is combusted in the fluidized bed combustor, and therefore, the present invention is directed to a method that uses the fluidized bed combustor.

With respect to the fluidized bed pressurized combustor, when the type of coal used is changed and parameters are chosen such that r=1.2 and θ=4.0, as heretofore noted, and the NOx data is extracted at the orifice of the furnace at the time of combustion, a relationship between the NOx conversion rate and the (N-Component of Coal)/(High level Calorific Value of a unit mass of fuel), as shown in FIG. 8, can be established. The reason for the increase of the NOx conversion rate (%) with the increase of the high level calorific value of a unit mass of fuel is that as the reactive temperature rises, an oxidative reaction of N in the form of $4NH_3+5O_2 \rightarrow 4NO+6H_2O$ is promoted.

Figure 9:
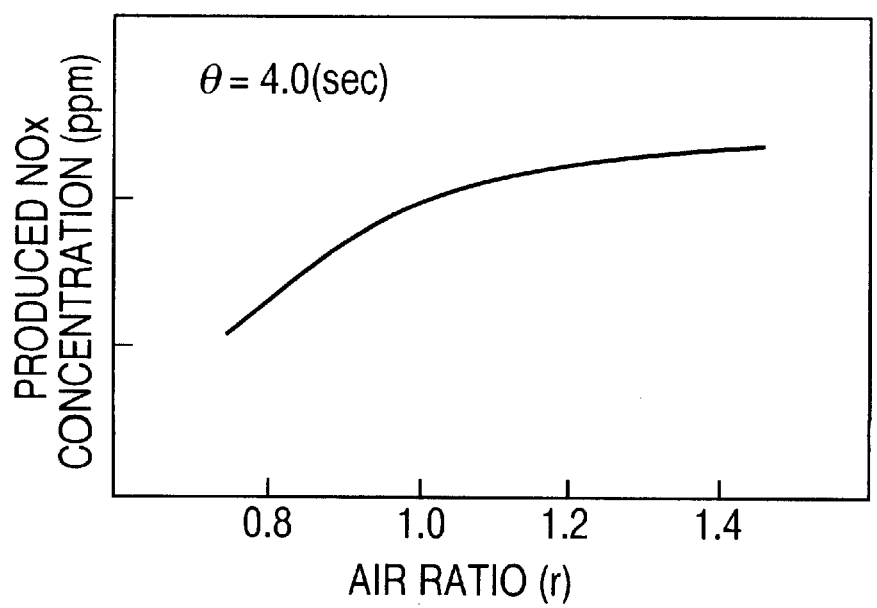
FIG. 9 is a graph showing reationship between air ratio and concentration of NOx.
Figure 10:
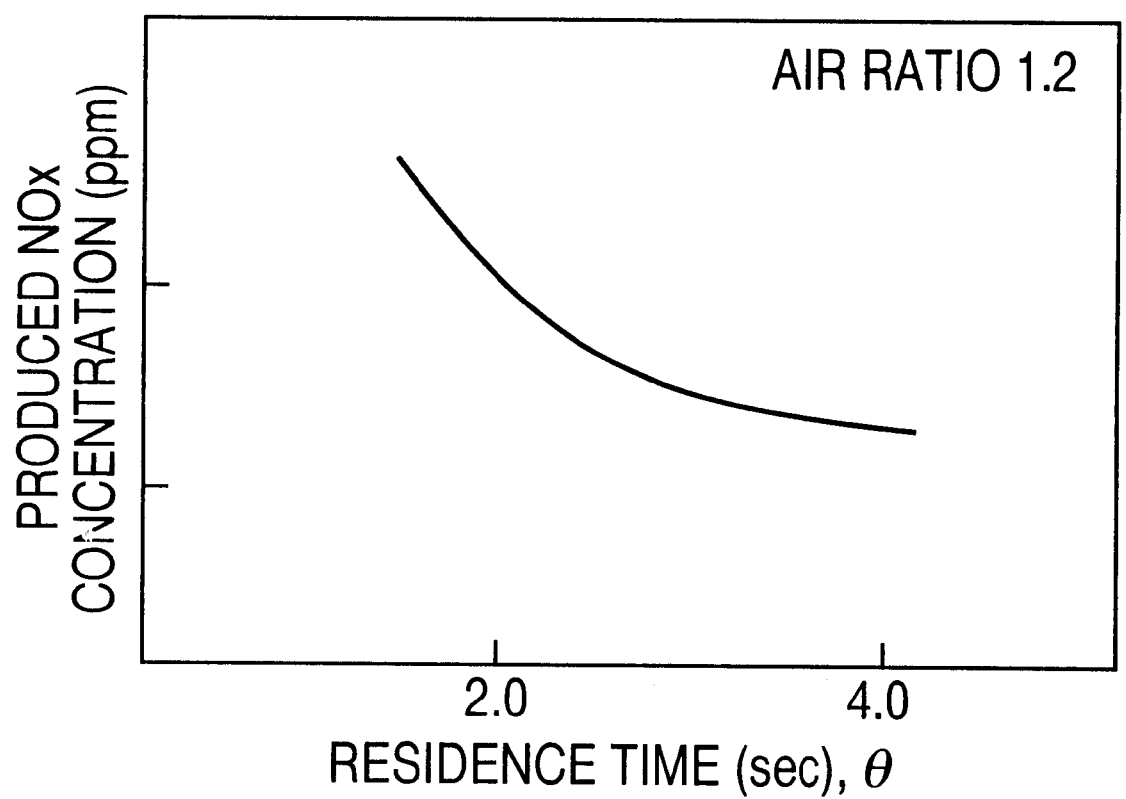
FIG. 10 is a graph showing relationship between gas residence time and concentration of NOx.

FIG. 9 shows a relationship between air ratio and concentration of NOx; whereas FIG. 10 shows a relationship between gas residence time and concentration of NOx. Formulae 2 and 3 in the specification, respectively, described these relationships.

As shown in FIG. 9, there is a trend that as the air ratio increases, NOx generated from the fluidized bed also increases. This is because as the concentration of $O_2$ increases, a reaction, $4NH_3+5O_2 \rightarrow 4NO+6H_2O$ is promoted to increase the production of NOx. Also, in this instance, θ=4.0.

As shown in FIG. 10, there is a trend that as the residence time increases, NOx generated from the fluidized bed decreases. This is because as the residence time increases, a reaction, $NO+C \rightarrow (1/2)N_2+CO$, is promoted to reduce NOx. Also, in this instance, r is 1.2 and θ is 4.0. The above reaction is particular to the fluidized bed combustor.

Therefore, in accordance with the present invention, by combusting a plurality of different types of coal in the fluidized bed combustor, determining a relationship between the NOx conversion rate and the N-component-of-coal/high-level-calorific-value at a fixed air ratio and a fixed gas residence time, ascertaining a reference NOx concentration based on this relationship, and adding to the reference NOx concentration a changed amount of the NOx concentration attributed to a change in the air ratio and in the gas residence time, the NOx concentration can be predicted.

A definition or meaning of the term "high level calorific value of a unit mass of fuel" is given as follows: There are two types of calorific values, i.e. a high level calorific value of a unit mass of fuel and a low level calorific value of a unit mass of fuel. The former contains the latent heat of vaporization of water and the latter does not. Consequently, the "high level calorific value of a unit mass of fuel" has a higher value than the low level calorific value of a unit mass of fuel. The order of the values does not change when a different type of coal is combusted.

The constants heretofore noted in the specification are determined as follows:

1) The method of determining m in formula (5):

a) the ratio of nitrogen contained in a unit mass of fuel and the high level calorific value of a unit mass of fuel can be determined by analyzing the coal;

b) from the result of a combustion test for more than 5 coals in a pressurized fluidized bed combustor, a conversion rate to harmful oxide NOx (%) and {(Ratio of nitrogen contained in a unit mass of fuel)/(High level calorific value of a unit mass of fuel)} can be obtained from the formula:

$$\ln(\text{a conversion rate to harmful oxide } (\%)) = m.\ln\{(\text{Ratio of nitrogen contained in a unit mass of fuel})/(\text{High level calorific value of a unit, mass of fuel})\} + b \quad (1')$$

(formula (1') is determined by calculations by the least-squares method. m is slope of the straight line, b is Y intercept.)

For example, m and b are, respectively, −0.8493 and 2.32.

c) formula (1') can be converted to formula (2').

$$\text{(a conversion rate to harmful oxide (\%))} = e^b \cdot \{\text{(Ratio of nitrogen contained in a unit mass of fuel)/(High level calorific value of a unit mass of fuel)}\}^m \quad (2')$$

For example, m and $e^b$ are, respectively, −0.8493 and 10.2.

2) The method of determining E:

E can be determined by using a conversion rate to harmful oxide (%) in the following formula:

$$\text{Reference Concentration of NOx(ppm)} = \text{Amount of Fuel Supplied (kg/h)} \times \{\text{Ratio of all Nitrogen in Coal (wt \%)}\}/100 \times \{\text{a conversion rate to harmful oxide (\%)}\}/100 / \{\text{Nitrogen atomic weight (kg/kmol)}\} \times 22.4(\text{Nm}^3/\text{kmol})/\{\text{Amount of Exhaust Gas (Nm}^3/\text{h})\} \times 10^6 \quad (3')$$

For example, $E = 10.2/14 \times 22.4 \times 100 = 1632$

The constants Ar, B and n in the following formula:
Predicted concentration of NOx = Reference concentration of $$NOx + Ar(r-rs) + B(\theta s - \theta)^n rs = 1.2, \theta s = 4.0 \quad (4')$$

Ar can be determined as follows:

3) The method of determining Ar:

At the condition of $\theta = \theta s = 4$, one measures NOx, changing value of r.

(4') formula can be converted to formula (5).

$$\text{Measured NOx(ppm)} = \text{Reference concentration of } NOx + Ar(r-1.25') $$

$$Ar = (\text{Measured NOx} - \text{Reference concentration of } NOx)/(r-1.2) \quad (6')$$

Values of r and measured NOx are substituted for (6) formula and Ar can be determined.

4) The method of determining B, n

At the condition of $r = rs = 1.2$, one measures NOx, changing value of $\theta$.

(4') formula can be converted to formula (7').

$$\text{Measured NOx(ppm)} = \text{Reference concentration of } NOx + B(4-\theta)^n (7')$$

First, one measures NOx, changing value of $\theta$.

The value of B and n are determined to minimize the difference of measured NOx and predicted concentration of NOx by calculations by the least-squares method.

5) The constant (I) is determined as follows:

Reference Concentration of SOx(ppm) = Amount of fuel supplied (kg/h)×{ratio of all sulfur in coal (wt %)}/100/ {Sulfur atomic weight (kg/kmol)×22.4(Nm³/kmol)/ {Amount of exhaust gas (Nm³/h)}×10⁶

$I = 1/100/32 \times 22.4 \times 10^6 = 7000$

6) The constant G and H are obtained as follows:

First, one measures SOx, changing value of r.

The values of G and H are determined to minimize the difference of measured SOx and predicted concentration of SOx by calculations by the least-squares method.

7) The constants A1, A2, A3, B, n in formula (1a) are obtained as follows:

Predicted concentration of NOx = Reference concentration of NOx+A1[A2−exp {A3(r−rs)}]+B($\theta$s−$\theta$)$^n$(9') rs=1.20, $\theta$s=4.0

First, NOx is obtained in predicting formula (9') including unknown constants A1, A2, A3, B and n.

Next, one measures NOx, changing value of r and $\theta$.

The values of A1, A2, A3, B and n are determined to minimize the difference of measured NOx and predicted concentration of NOx by calculations by the least-squares method.

8) The constant F in the formula (6) is obtained as follows:

$$\text{Amount of NH}_3 \text{ to be injected (kg/h)} = \{(\text{Set NH}_3/\text{Mole Ratio of NOx}(-)) \times \{\text{Predicted Concentration of NOx(ppm)}\}/\{\text{NH}_3 \text{ molecular weight (kg/kmol)}/22.4(\text{Nm}^3/\text{kmol})/(10^6) \times \{\text{Amount of Gas(Nm}^3/\text{h})\} \quad (10')$$

$F = 1/17/22.4/(10^6) = 2.4 \times 10^{-9}$

It will be understood that in the above determination, reference air ratio is equal to 1.20; whereas reference gas residence time is equal to 4.0.

What is claimed is:

1. A method of controlling an amount of harmful oxide by injecting a treatment agent into an exhaust gas generated when solid hydrocarbon fuel is combusted in a fluidized bed combustor, comprising the steps of:

detecting an amount of fuel supplied to a fluidized bed combustor and determining a reference concentration of harmful oxide from an amount of said fuel supplied, a conversion rate to harmful oxide, which is determined from a ratio of content of a substance as a harmful oxide generating source and a calorific value which are determined by a type of fuel under the conditions of a specific air ratio and gas residence time in said fluidized bed combustor, and an amount of an exhaust gas, and predicting an amount of the harmful oxide in said exhaust gas from the reference concentration of said harmful oxide and an amount of change of an air ratio and an amount of change of a gas residence time to the specific air ratio and gas residence time; and injecting a controlled amount of said treatment agent based on the predicted amount of said harmful oxide, wherein said harmful oxide is nitrogen oxide (NOx) and said treatment agent is ammonia (NH$_3$).

2. A method of controlling an amount of harmful oxide according to claim 1 wherein said gas residence time is determined by a bed height introduced from the values indicated by a plurality of differential pressure gauges disposed in said fluidized bed combustor.

3. A method of controlling an amount of harmful oxide according to claim 1, wherein said treatment agent is injected from a nozzle disposed in an exhaust gas duct connected to said fluidized bed combustor.

4. A method of controlling an amount of harmful oxide according to claim 1, wherein the reference concentration of said harmful oxide (NOx) is determined from the following equation;

Reference Concentration of NOx = E×(Amount of Fuel Supplied)×(Ratio of Nitrogen contained in Fuel)×{ (Ratio of Nitrogen Contained in Fuel)/(High Level Calorific Value of Fuel)}$^m$−(Amount of Exhaust Gas)

where, E and m are constants.

5. A method of controlling an amount of harmful NOx by injecting ammonia into an exhaust gas in a system for recovering power by driving a gas turbine by the exhaust gas which is generated by combusting coal in a fluidized bed pressurized boiler, comprising the steps of:

detecting an amount of NOx in the exhaust gas on the downstream side of said gas turbine;

further injecting ammonia when the amount of the detected NOx exceeds an upper limit value;

detecting a remaining amount of the ammonia on the downstream side of said gas turbine; and stopping the injection of ammonia when the remaining amount of said detected ammonia exceeds an upper limit value.

6. A method of controlling an amount of harmful oxide comprising nitrogen oxide (NOx), by injecting a treatment agent, comprising ammonia (NH$_3$), into an exhaust gas generated when solid hydrocarbon fuel is combusted in a fluidized bed combustor, comprising the steps of:

determining a reference concentration of NOx from the following formula;

Reference concentration of NOx=E×(Amount of fuel supplied)×(Ratio of all nitrogen in fuel)×{(Ratio of nitrogen contained in a unit mass of fuel)/(High level calorific value of a unit mass of fuel)}$^m$÷(Amount of exhaust gas)

where, E and m are constants, predicting a concentration of NOx in said exhaust gas from the reference concentration of NOx and an amount of change of an air ratio and an amount of change of a gas residence time in said fluidized bed to the reference air ratio and the reference gas residence time in said fluidized bed; and controlling an amount of injection of said treatment agent based on the predicted amount of NOx.

7. A method of controlling an amount of harmful oxide according to claim 6, wherein said concentration of NOx in said exhaust gas is determined and predicted from the following formula:

Predicted concentration of NOx=Reference concentration of NOx+Ar(R−r$_s$)+B(θ$_s$−θ)$^n$ where, r: air ratio, r$_s$: reference air ratio, θ$_s$: reference gas residence time, θ: gas residence time, and A, B and n are constants.

8. A method of controlling an amount of harmful oxide according to claim 6, wherein said gas residence time is determined by a bed height introduced from the values indicated by a plurality of differential pressure gauges disposed in said fluidized bed combustor.

9. A method of controlling an amount of harmful oxide according to claim 6, wherein said treatment agent is injected from a nozzle disposed in an exhaust gas duct connected to said fluidized bed combustor.

10. A method of controlling an amount of harmful oxide by injecting a treatment agent into an exhaust gas generated when solid hydrocarbon fuel is combusted in a fluidized bed combustor, comprising the steps of:

determining a relationship between an NOx conversion rate and a ratio of nitrogen component in solid hydrocarbon fuel and a high level calorific value by combusting a plurality of different types of the solid hydrocarbon fuel at a fixed air ratio and at a fixed gas residence time;

ascertaining a reference NOx concentration based on said relationship;

predicting an NOx concentration by adding to said reference NOx concentration a changed amount of NOx concentration produced by a change in the air ratio and in the gas residence time;

determining a rate of injection of ammonia for injection into said exhaust gas based on said predicted NOx concentration; and injecting said ammonia into said exhaust gas.

11. The method of claim 10, wherein the solid hydrocarbon fuel is coal and at least five types of coal are combusted to determine the relationship between NOx conversion rate and the ratio of nitrogen component in the coal and the high level calorific value.

12. A method of controlling an amount of harmful NOx by injecting ammonia into an exhaust gas in a system for recovering power by driving a gas turbine by the exhaust gas which is generated by combusting coal in a fluidized bed pressurized boiler, comprising the steps of:

detecting an amount of NOx in the exhaust gas on the downstream side of said gas turbine;

further injecting ammonia when the amount of the detected NOx exceeds an upper limit value;

detecting a remaining amount of the ammonia on the downstream side of said gas turbine, and stopping the injection of ammonia when the remaining amount of said detected ammonia exceeds an upper limit value.

13. A method of controlling an amount of harmful oxide by injecting a treatment agent into an exhaust gas generated when solid hydrocarbon fuel is combusted in a fluidized bed combustor, comprising:

detecting an amount of fuel supplied to a fluidized bed combustor and determining a reference concentration of harmful oxide from an amount of said fuel supplied, a conversion rate to harmful oxide, which is determined from a ratio of content of a substance as a harmful oxide generating source and a calorific value which are determined by a type of fuel under the conditions of a specific air ratio and gas residence time in said fluidized bed combustor, and an amount of an exhaust gas, and predicting an amount of the harmful oxide in said exhaust gas from the reference concentration of said harmful oxide and an amount of change of an air ratio and an amount of change of a gas residence time to the specific air ratio and gas residence time; and injecting a controlled amount of said treatment agent based on the predicted amount of said harmful oxide, and wherein said harmful oxide is nitrogen oxide (NOx) and said treatment agent is ammonia (NH$_3$), wherein the method does not include a step of analyzing NOx or SOx from exhaust gas with an NOx or SOx analyzer.

14. A method of controlling an amount of harmful oxide by injecting a treatment agent into an exhaust gas generated when solid hydrocarbon fuel is combusted in a fluidized bed combustor, consisting of:

detecting an amount of fuel supplied to a fluidized bed combustor and determining a reference concentration of harmful oxide from the amount of said fuel supplied, a conversion rate to harmful oxide, which is determined from a ratio of content of a substance as a harmful oxide generating source and a calorific value which are determined by a type of fuel under the conditions of a specific air ratio and gas residence time in said fluidized bed combustor, and an amount of an exhaust gas, and predicting an amount of the harmful oxide in said exhaust gas from the reference concentration of said harmful oxide and an amount of change of an air ratio and an amount of change of a gas residence time to the specific air ratio and gas residence time; and injecting a controlled amount of said treatment agent based on the predicted amount of said harmful oxide, wherein said harmful oxide is nitrogen oxide (NOx) and said treatment agent is ammonia (NH$_3$).

15. A method of controlling an amount of harmful oxide by injecting a treatment agent into an exhaust gas generated when solid hydrocarbon fuel is combusted in a fluidized bed combustor, comprising the steps of:

detecting an amount of fuel supplied to a fluidized bed combustor and determining a reference concentration of harmful oxide from an amount of said fuel supplied, a conversion rate to harmful oxide, which is determined from a ratio of content of a substance as a harmful oxide generating source and a calorific value which are determined by a type of fuel under the conditions of a specific air ratio and gas residence time in said fluidized bed combustor, and an amount of an exhaust gas, and predicting an amount of the harmful oxide in said exhaust gas from the reference concentration of said harmful oxide and an amount of change of an air ratio and an amount of change of a gas residence time to the specific air ratio and gas residence time, wherein the reference concentration of said harmful oxide (NOx) is determined from the following equation;

Reference Concentration of NOx=E×(Amount of Fuel Supplied)×(Ratio of Nitrogen contained in Fuel)×{(Ratio of Nitrogen Contained in Fuel)/(High Level Calorific Value of Fuel)}$^{m}$−(Amount of Exhaust Gas) where, E and m are constants; and injecting a controlled amount of said treatment agent based on the predicted amount of said harmful oxide, wherein said harmful oxide is nitrogen oxide (NOx) and said treatment agent is ammonia ($NH_3$).

* * * * *